(12) United States Patent
Hunt

(10) Patent No.: US 7,345,619 B2
(45) Date of Patent: Mar. 18, 2008

(54) GENERATING EVENT SIGNALS IN A RADAR SYSTEM

(75) Inventor: Dennis Hunt, Westford, MA (US)

(73) Assignee: Valeo Raytheon Systems, Inc., Hudson, NH (US)

( * ) Notice: Subject to any disclaimer, the term of this patent is extended or adjusted under 35 U.S.C. 154(b) by 95 days.

(21) Appl. No.: 11/323,960

(22) Filed: Dec. 30, 2005

(65) Prior Publication Data
US 2007/0152873 A1 Jul. 5, 2007

(51) Int. Cl.
H03B 21/00 (2006.01)
(52) U.S. Cl. .................. 342/70; 342/200; 327/106; 327/107
(58) Field of Classification Search .............. 342/70
See application file for complete search history.

(56) References Cited

U.S. PATENT DOCUMENTS

| | | | |
|---|---|---|---|
| 2,540,839 A | | 2/1951 | Southworth |
| 3,979,748 A | * | 9/1976 | Gellekink ............... 342/132 |
| 4,202,215 A | * | 5/1980 | Meyer ..................... 73/599 |
| 4,286,236 A | | 8/1981 | Fischer |
| 4,499,435 A | * | 2/1985 | Thomson et al. ........... 331/44 |
| 4,593,287 A | * | 6/1986 | Nitardy .................... 342/200 |
| 4,618,863 A | * | 10/1986 | Collins ................... 342/194 |
| 4,620,192 A | * | 10/1986 | Collins ................... 342/128 |
| 4,647,873 A | * | 3/1987 | Beckner et al. ............. 331/4 |
| 5,019,825 A | * | 5/1991 | McCorkle ................ 342/201 |
| 5,194,823 A | | 3/1993 | Wendt et al. |
| 5,252,981 A | * | 10/1993 | Grein et al. .............. 342/200 |
| 5,307,284 A | * | 4/1994 | Brunfeldt et al. ............ 702/76 |
| 5,369,665 A | * | 11/1994 | Bai et al. .................... 375/130 |
| 5,410,621 A | * | 4/1995 | Hyatt ........................ 382/260 |
| 5,592,178 A | | 1/1997 | Chang et al. |
| 5,619,208 A | * | 4/1997 | Tamatsu et al. ............. 342/70 |
| 5,708,433 A | | 1/1998 | Craven |
| 5,727,023 A | | 3/1998 | Dent |
| 6,039,580 A | | 3/2000 | Sclarretta et al. |
| 6,072,426 A | * | 6/2000 | Roos ......................... 342/174 |
| 6,167,286 A | | 12/2000 | Ward et al. |

(Continued)

FOREIGN PATENT DOCUMENTS

WO WO 2004/044610 A1 5/2004

OTHER PUBLICATIONS

Kelly, Jr. et al.; "Method and System for Radar Processing;" U.S. Appl. No. 11/458,126, filed Jul. 18, 2006.

(Continued)

Primary Examiner—Thomas Black
Assistant Examiner—Shelley Chen
(74) Attorney, Agent, or Firm—Daly, Crowley, Mofford & Durkee, LLP

(57) ABSTRACT

A radar system having a transmit signal path and a receive signal path and an event generator which is responsive to command signals provided by a digital signal processor (DSP) is described. The DSP generates command signals and provides the command signals to the event generator. In response to the command signals, the event generator generates event signals in the radar system. The event signals include but are not limited to ramp control signals provided to a controllable signal source which provide RF signals to the transmit path of the radar.

25 Claims, 7 Drawing Sheets

U.S. PATENT DOCUMENTS

| | | | |
|---|---|---|---|
| 6,198,449 | B1 | 3/2001 | Muhlhauser et al. |
| 6,218,987 | B1 | 4/2001 | Derneryd et al. |
| 6,324,755 | B1 | 12/2001 | Borkowski et al. |
| 6,463,303 | B1 | 10/2002 | Zhao |
| 6,489,927 | B2 | 12/2002 | LeBlanc et al. |
| 6,492,949 | B1 | 12/2002 | Breglia et al. |
| 6,501,415 | B1 | 12/2002 | Viana et al. |
| 6,577,269 | B2 | 6/2003 | Woodington et al. |
| 6,577,879 | B1 | 6/2003 | Hagerman et al. |
| 6,642,908 | B2 | 11/2003 | Pleva et al. |
| 6,683,557 | B2 | 1/2004 | Pleva et al. |
| 6,738,017 | B2 | 5/2004 | Jacomb-Hood |
| 6,784,838 | B2 | 8/2004 | Howell |
| 6,864,699 | B2 | 3/2005 | Sakayori et al. |
| 6,933,900 | B2 | 8/2005 | Kitamori et al. |
| 6,995,730 | B2 | 2/2006 | Pleva et al. |
| 7,038,608 | B1 | 5/2006 | Gilbert |
| 2003/0016163 | A1* | 1/2003 | Isaji ............................ 342/70 |
| 2003/0151543 | A1* | 8/2003 | Nakanishi et al. ............ 342/70 |
| 2004/0027305 | A1 | 2/2004 | Pleva et al. |
| 2004/0164892 | A1 | 8/2004 | Shinoda et al. |
| 2004/0208249 | A1 | 10/2004 | Risbo et al. |
| 2005/0007271 | A1* | 1/2005 | Isaji ............................ 342/70 |
| 2006/0125682 | A1 | 6/2006 | Kelly, Jr. et al. |
| 2006/0152406 | A1 | 7/2006 | Leblanc et al. |
| 2007/0103354 | A1* | 5/2007 | Inatsune .................... 341/144 |

OTHER PUBLICATIONS

Kelly, Thomas M., Jr.; "Method and System for Radar Processing", U.S. Appl. No. 11/458,126, filed Jul. 18, 2006.

Cheng; "A Fast Hybrid MoM/FEM Technique for Microstripline Vertical Couplers With Multiple Identical Cavaties;" IEEE Jun. 2003; 0-7603-7846; pp. 1076-1079.

Gao et al.; "Adaptive Linearization Schemes for Weakly Nonlinear Systems Using Adaptive Linear and Nonlinear FIR Filters;" Dept. of Electrical Engineering, University of Toronto; IEEE; Jan. 1991; CH2619-1/90/0000-0009; pp. 9-12.

Lin et al.; "A High Speed Low-Noise Equalization Technique with Improved Bit Error Rate;" EEE; Jul. 2002; 0-7803-7448; pp. 564-567.

Lohinetong et al.; "Microstrip To Surface Mounted Foam-Based Waveguide Transition For Ka-Band Filter Integration;" IEEE Jun. 2004; 0-7803-8401; pp. 899-902.

Mueller; "SMD-Type 42 GHz Waveguide Filter;" IEEE Jan. 2003; 0-7803-7695; pp. 1089-1092.

Nordsjo; "An Algorithm for Adaptive Predisortion of Certain Time-Varying Nonlinear High-Power Amplifiers;" 2002 The Institution of Electrical Engineers; XP-002364938; pp. 469-473.

EP Search Report and Written Opinion of the European Patent Office for EP 05 11 1991.5; dated Mar. 2, 2006.

EP Search Report and Written Opinion of the European Patent Office for EP 05 11 1994.9 dated Mar. 31, 2006.

EP Report and Written Opinion of the European Patent Office for EP 05 111 983.2 dated Apr. 7, 2006.

Pleva, et al.; "Beam Architecture For Improving Angular Resolution"; U.S. Appl. No. 11/026,506, filed Dec. 30, 2004.

Pleva, et al.; "Waveguide—Printed Wiring Board (PWB) Interconnection"; U.S. Appl. No. 11/027,523, filed Dec. 30, 2004.

Leblanc et al.; "Vehicle Radar Sensor Assembly"; U.S. Appl. No. 11/323,816, filed Dec. 30, 2005.

Lohmeier et al.; "System And Method For Generating A Radar Detection Threshold;" U.S. Appl. No. 11/322,684, filed Dec. 30, 2005.

Lohmeier et al.; "System And Method For Verifying A Radar Detection;" U.S. Appl. No. 11/324,073, filed Dec. 30, 2005.

Lohmeier et al.; "Method And System For Generating A Target Alert;" U.S. Appl. No. 11/322,869, filed Dec. 30, 2005.

Woodington, et al.; "Detecting Signal Interference In A Vehicle System"; U.S. Appl. No. 11/427,829, filed Jun. 30, 2006.

Gilbert; "Multi-Stage Finite Impulse Response Filter Processing"; U.S. Appl. No. 11/323,459, filed Dec. 30, 2005.

Woodington, et al.; "Multichannel Processing Of Signals In A Radar System"; U.S. Appl. No. 11/323,458, filed Dec. 30, 2005.

Woodington, et al.; "Vehicle Radar Systems Having Multiple Operating Modes"; U.S. Appl. No. 11/324,035, filed Dec. 30, 2005.

Woodington; "Reducing Undesirable Coupling Of Signal(s) Between Two Or More Signal Paths In A Radar System"; U.S. Appl. No. 11/323,982, filed Dec. 30, 2005.

Woodington; "Reducing Undesirable Coupling Of Signal(s) Between Two Or More Signal Paths In A Radar System"; U.S. Appl. No. 11/322,664, filed Dec. 30, 2005.

* cited by examiner

GENERATING EVENT SIGNALS IN A RADAR SYSTEM

CROSS-REFERENCE WITH OTHER PATENT APPLICATIONS

This patent application includes aspects from the following patent applications, which are all incorporated herein by reference in their entirety: Application Ser. No. 11/323,459, filed Dec. 30, 2005 and entitled "MULTI-STAGE FINITE IMPULSE RESPONSE FILTER PROCESSING"; Application Ser. No. 11/323,458, filed Dec. 30, 2005 and entitled "MULTICHANNEL PROCESSING OF SIGNALS IN A RADAR SYSTEM"; Application Ser. No. 11/324,035, filed Dec. 30, 2005 and entitled "VEHICLE RADAR SYSTEM HAVING MULTIPLE OPERATING MODES"; Application Ser. No. 11/323,982, filed Dec. 30, 2005 and entitled "REDUCING UNDESIRABLE COUPLING OF SIGNAL(S) BETWEEN TWO OR MORE SIGNAL PATHS IN A RADAR SYSTEM"; Application Ser. No. 11/322,664, filed Dec. 30, 2005 and entitled "REDUCING UNDESIRABLE COUPLING OF SIGNAL (S) BETWEEN TWO OR MORE SIGNAL PATHS IN A RADAR SYSTEM"; and Application Ser. No. 11/322,684, filed Dec. 30, 2005 and entitled "SYSTEM AND METHOD FOR GENERATING A RADAR DETECTION THRESHOLD".

TECHNICAL FIELD

The invention relates to radar systems, and more particularly, to generating transmitter and receiver control signals in a radar system.

BACKGROUND

Radar systems have been developed for various applications associated with a variety of different types of vehicles, including but not limited to automobiles, trucks and boats. A radar system mounted on a vehicle detects the presence of objects, including other vehicles, in proximity to the vehicle. Such a vehicle radar system may be used in conjunction with a braking system of the vehicle to assist in active collision avoidance or in conjunction with a cruise control system of the vehicle to provide intelligent speed and traffic spacing control. In a further application, the vehicle radar system may be used to provide to a driver of the vehicle an indication of obstacles in or proximate a path of the vehicle.

SUMMARY OF THE INVENTION

In one aspect, the invention is a method of operating a radar system having a transmit signal path and a receive signal path. The method includes generating a command in a digital signal processor (DSP) of the radar system, receiving the command from a digital signal processor in an event generator, and generating event signals in the radar system via the event generator based upon receipt of the command from the digital signal processor.

In another aspect, the invention is an event generator adapted to provide a control signal to a controllable signal source. The event generator includes registers, with at least a first one of the registers adapted to have stored therein a value which defines the number of waveform, at least a second one of the registers adapted to have stored a value which defines the type of waveform; and at least a third one of the registers adapted to have stored therein a value which defines a starting voltage of each of the waveforms. The waveforms may include chirp waveforms.

In a further aspect, the invention is an event generator adapted to provide a control signal to a controllable signal source. The event generator includes registers, with at least a first one of the registers adapted to have stored therein a value which defines a number of waveforms, a type of waveform for each waveform; and a duration of the waveforms.

The aspects above may include one or more of the following advantages. In one advantage, multiple control signals to control or modulate RF signals provided by a signal source may be generated without burdening a digital signal processor. Furthermore, using a distributed approach to generating signal source control signals, frees up the DSP to focus on other processing functions related to processing of received signals In another advantage, the event generator includes registers in which values (e.g., start values, type of chirp waveform values, chirp waveform duration period values and compensation values) can be loaded to support a- variety of different modulation schemes. Thus, the event generator provides flexibility in selecting and enabling RF waveform modulation schemes. In one example, a single register value may designate the type of chirp waveforms and the number of chirp waveforms. By providing a separate event generator with registers in which operating parameters can be loaded, a designer has the flexibility to utilize different waveform shapes, and different numbers waveforms. The event generator in combination with a DAC provides a flexible waveform generator which can be used to modulate a voltage controlled oscillator (VCO) or other controllable signal source. The event generator allows a designer or user to generate up-ramp, down-ramp and tone control signals or any combination thereof to meet external conditions. The advantages listed are not intended to include each and every advantage. Other advantages will be apparent to one skilled in the art in light of the claims, drawings and description.

DETAILED DESCRIPTION

Described herein is a novel approach for generating event signals in a radar system using an event generator. The event signals include signals which generate chirp control signals provided to a controllable signal source (e.g., a voltage controlled oscillator or VCO) which, in response to the chirp control signals provides RF signals to a transmit signal path of the radar system. The event signals also include control signals to synchronize digital samples provided from an analog-to-digital converter (ADC) along a receive path of the radar system. It should be appreciated that although the event generator is described herein as used in a vehicle detection system, the event generator may be used in any radar or other system which utilizes a controllable signal source.

Before proceeding with a discussion of exemplary embodiments as illustrated in the figures, it should be appreciated that reference is sometimes made herein to an event generator supplying voltage signals to control a signal source specified to be a voltage controlled oscillator (VCO). Those of ordinary skill in the art should appreciate that the concepts described herein apply to the control of any type of controllable signal source. It should also be appreciated that the event generator described herein can be adapted to supply signals to control any type of controllable signal source. For example, if the signal source were a current controlled signal source, then the event generator would provide current signals. It should thus be understood that the event generator can be adapted to provide any type of signal, including but not limited to analog or digital signals, having any signal characteristics necessary to appropriately control one or more of different types of signal sources.

Figure 1:
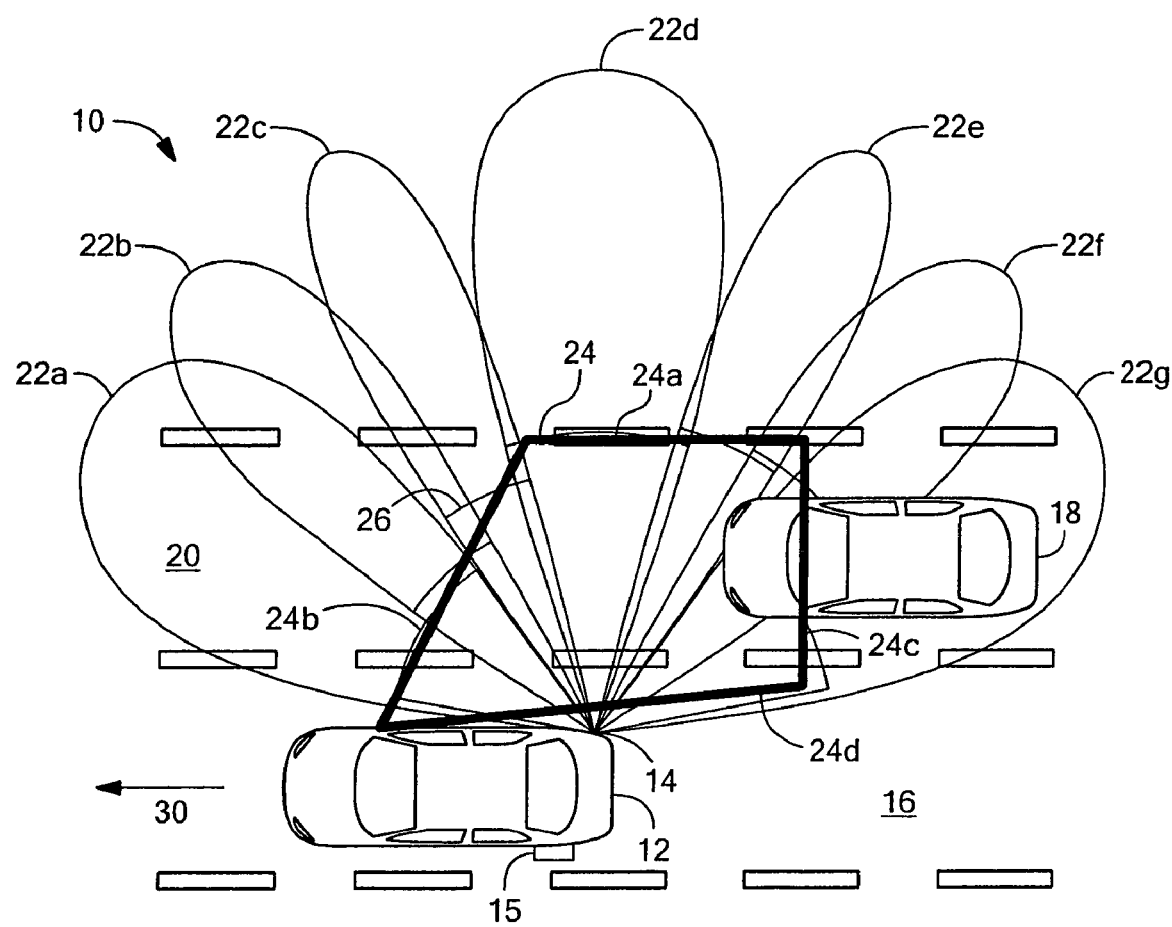
FIG. 1 is a diagrammatic view of a pair of vehicles traveling along a roadway.

Referring to FIG. 1, a first vehicle 12 traveling in a first traffic lane 16 of a road includes a side-object detection (SOD) system 14. The SOD system 14 is disposed on a side portion of the vehicle 12 and in particular, the SOD system 14 is disposed on a right rear quarter of the vehicle 14. The vehicle 12 also includes a second SOD system 15 disposed on a side portion of a left rear quarter of the vehicle 12. The SOD systems 14, 15 may be coupled to the vehicle 12 in a variety of ways. In some embodiments, the SOD systems may be coupled to the vehicle 12 as described in U.S. Pat. No. 6,489,927, issued Dec. 3, 2002, which is incorporated herein by reference in its entirety. A second vehicle 18 travels in a second traffic lane 20 adjacent the first traffic lane 16. The first and second vehicles 12, 18 are both traveling in a direction 30 and in the respective first and second traffic lanes 16, 20.

The second vehicle 18 may be traveling slower than, faster than, or at the same speed as the first vehicle 12. With the relative position of the vehicles 12, 18 shown in FIG. 1, the second vehicle 18 is positioned in a "blind spot" of the first vehicle 12. The blind spot is an area located on a side of the first vehicle 12 whereby an operator of the first vehicle 12 is unable to see the second vehicle 18 either through side-view mirrors 84, 86 (see FIG. 2) or a rear-view mirror (not shown) of the first vehicle 12.

The SOD system 14 generates multiple receive beams (e.g., a receive beam 22a, a receive beam 22b, a receive beam 22c, a receive beam 22d, a receive beam 22e, a receive beam 22f and a receive beam 22g) and an associated detection zone 24. The detection zone 24 is formed by the SOD system 14 by way of maximum detection ranges associated with each one of the receive beams 22a-22g, for example, the maximum detection range 26 associated with the receive beam 22c. Each of the receive beams 22a-22g may also have a minimum detection range (not shown), forming an edge 17 of the detection zone 24 closest to the first vehicle.

In one particular embodiment, the SOD system 14 is a frequency modulated continuous wave (FMCW) radar, which transmits continuous wave chirp radar signals, and which processes received radar signals accordingly. In some embodiments, the SOD system 14 may be of a type described, for example, in U.S. Pat. No. 6,577,269, issued Jun. 10, 2003; U.S. Pat. No. 6,683,557, issued Jan. 27, 2004; U.S. Pat. No. 6,642,908, issued Nov. 4, 2003; U.S. Pat. No. 6,501,415, issued Dec. 31, 2002; and U.S. Pat. No. 6,492,949, issued Dec. 10, 2002, which are all incorporated herein by reference in their entirety.

In operation, the SOD system 14 transmits an RF signal having portions which impinge upon and are reflected from the second vehicle 18. The reflected signals (also referred to as "echo" signals) are received in one or more of the receive beams 22a-22g. Other ones of the radar beams 22a-22g, which do not receive the echo signal from the second vehicle 18, receive and/or generate other radar signals, for example, noise signals. As used herein, the term "noise signal" is used to describe a signal comprised of one or more of a thermal noise signal, a quantization noise signal, a crosstalk signal (also referred to as leakage or feed through signal), and an ambient RF noise signal.

In some embodiments, the SOD system 14 may transmit RF energy in a single broad transmit beam (not shown). In other embodiments, the SOD system 14 may transmit RF energy in multiple transmit beams (not shown), for example, in seven transmit beams associated with the receive beams 22a-22g.

In operation, the SOD system 14 may process the received radar signals associated with each one of the receive beams 22a-22g in sequence, in parallel, or in any other time sequence. The SOD system 14 may be adapted to identify an echo radar signal associated with the second vehicle 18 when any portion of the second vehicle 18 is within the detection zone 24. Therefore, the SOD system 14 is adapted to detect the second vehicle 18 when at least a portion of the second vehicle is in or near the blind spot of the first vehicle 12.

Figure 2:
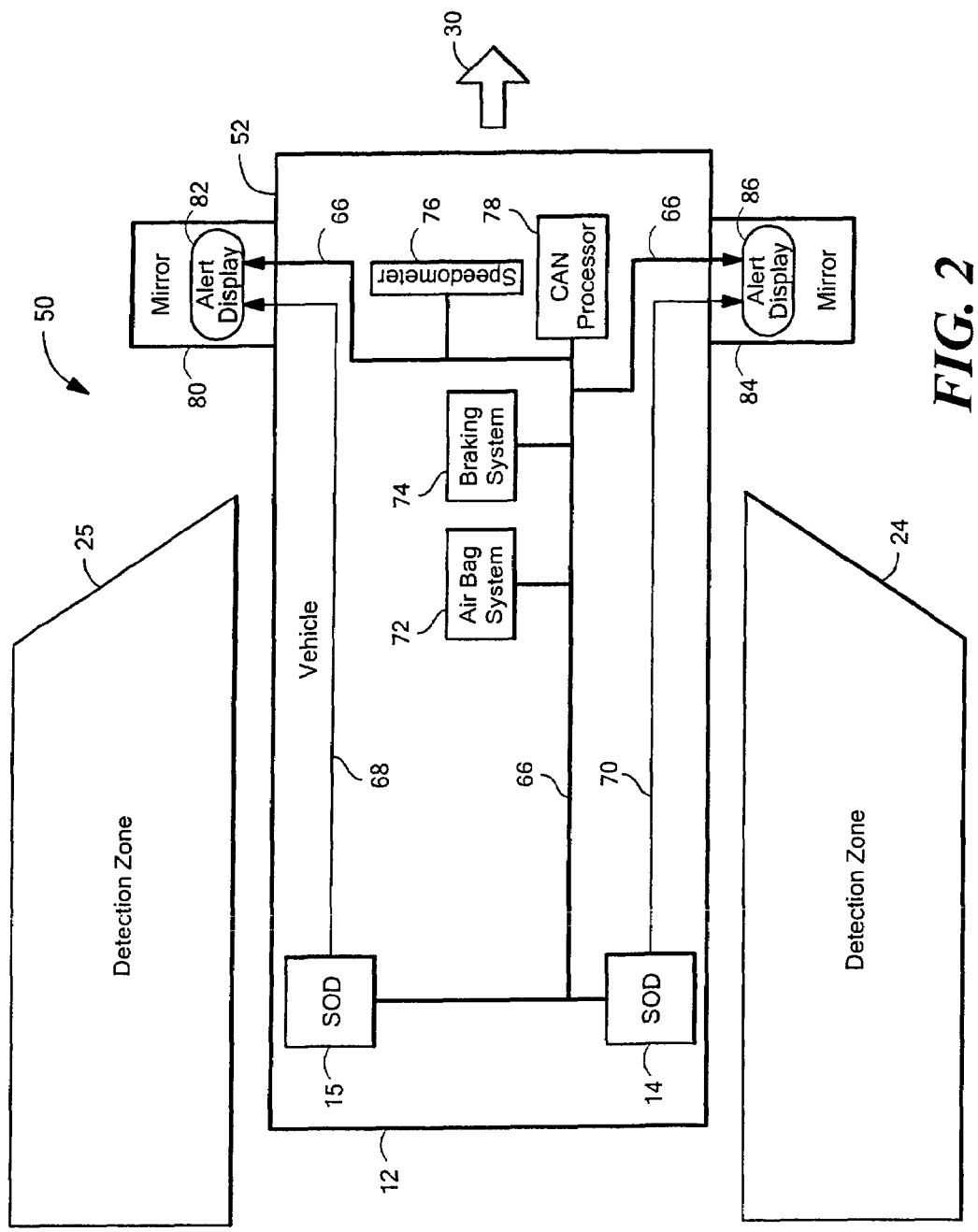
FIG. 2 is a block diagram of a vehicle system architecture.

Referring to FIG. 2, an exemplary vehicle system 50 which may be the same as or similar to the vehicle systems included in vehicles 12, 18 described above in conjunction with FIG. 1, includes vehicle systems such as SOD systems 14, 15, an air bag system 72, a braking system 74 and a speedometer 76.

Each one of the SOD systems 14, 15 is coupled to a Controller Area Network (CAN) processor 78 through a CAN bus 66. As used herein, the term "controller area network" is used to describe a control bus and associated control processor typically found in vehicles. For example, the CAN bus and associated CAN processor may control a variety of different vehicle functions such as anti-lock brake functions, air bags functions and certain display functions.

The vehicle 12 includes two side-view mirrors 80, 84, each having an alert display 82, 86, respectively, viewable therein. Each one of the alert displays 82, 86 is adapted to provide a visual alert to an operator of a vehicle in which system 50 is disposed (e.g., the vehicle 12 in FIG. 1) to indicate the presence of another vehicle in a blind spot of the vehicle). To this end, in operation, the SOD system 14 forms detection zone 24 and SOD system 15 forms a detection zone 25.

Upon detection of an object (e.g., another vehicle) in the detection zone 24, the SOD system 14 sends an alert signal indicating the presence of an object to either or both of the alert displays 82, 84 through the CAN bus 66. In response to receiving the alert signal, the displays provide an indicator (e.g., a visual, audio, or mechanical indicator) which indicates the presence of an object. Similarly, upon detection of an object in the detection zone 25, SOD system 15 sends an alert signal indicating the presence of another vehicle to one or both of alert displays 82, 86 through the CAN bus 66. However, in an alternate embodiment, the SOD system 14 may communicate the alert signal to the alert display 82 through a human/machine interface (HMI) bus 68. Similarly, SOD system 15 may communicate the alert signal to the other alert display 86 through another human/machine interface (HMI) bus 70.

Figure 3:
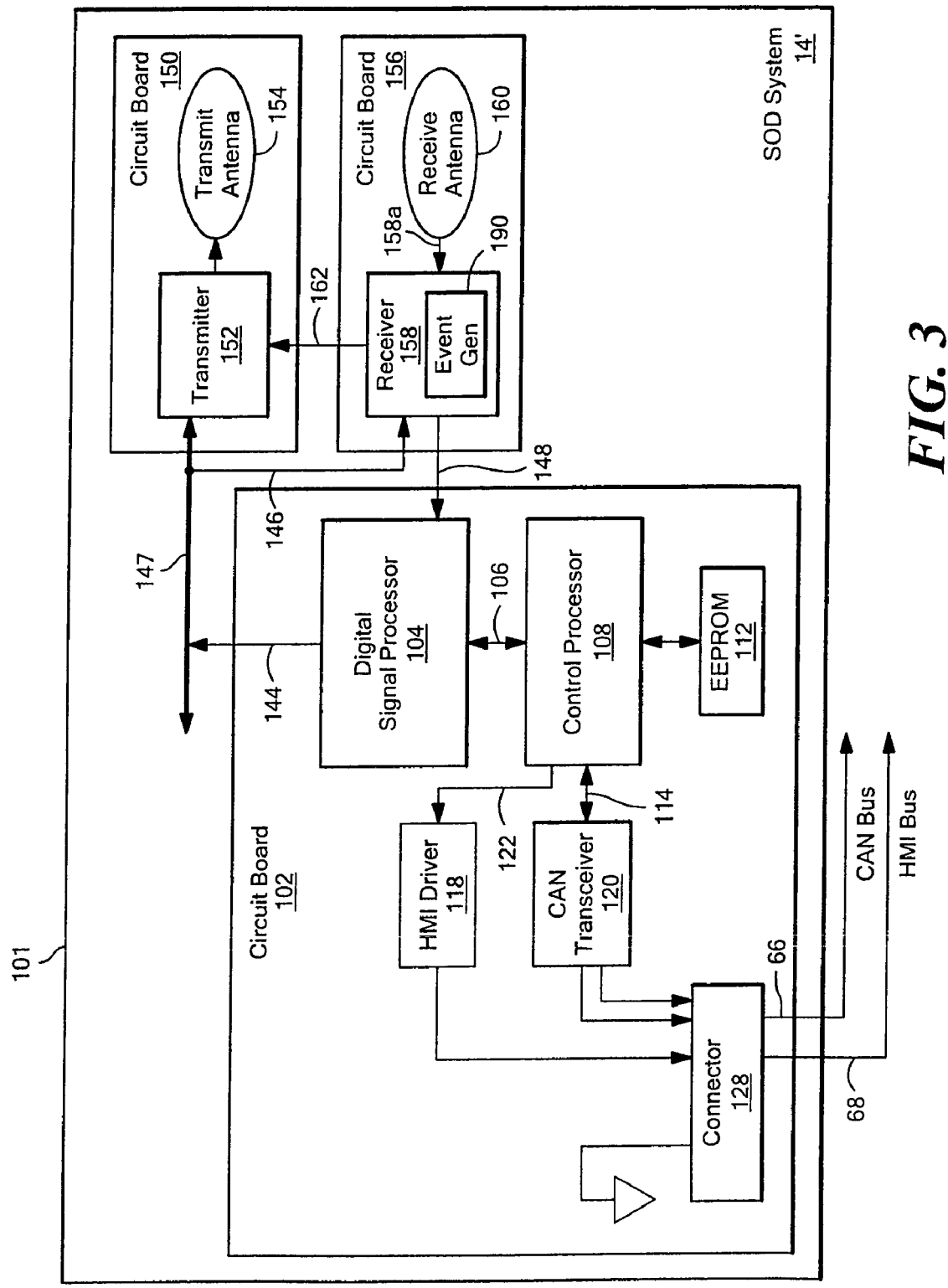
FIG. 3 is a block diagram of a vehicle radar system.

Referring to FIG. 3, a SOD system 14' which may be the same as or similar to SOD 14 described above in conjunction with FIGS. 1 and 2, includes a housing 101, in which a fiberglass circuit board 102, a polytetrafluoroethylene (PTFE) circuit board 150, and a low temperature co-fired ceramic (LTCC) circuit board 156 reside. In other embodiments, circuit board 150 may be a LTCC. In other embodiments, circuit board 150 may be a hydrocarbon material.

The fiberglass circuit board 102 has disposed thereon a digital signal processor (DSP) 104 coupled to a control processor 108. In general, the DSP 104 is adapted to perform signal processing functions, for example, fast Fourier transforms on signals provided thereto from the receiver. In some embodiments, the DSP 104 may be of a type described, for example, in U.S. patent application Ser. No. 11/102,352, filed Apr. 8, 2005 which is incorporated herein by reference in its entirety. The control processor 108 is adapted to perform digital functions, for example, to identify conditions under which an operator of a vehicle on which the SOD system 14 is mounted should be alerted to the presence of another object such as a vehicle in a blind spot.

The control processor 108 is coupled to an electrically erasable read-only memory (EEPROM) 112 adapted to retain a variety of values including but not limited to calibration values. Other read only memories associated with processor program memory are not shown for clarity. The control processor 108 is coupled to a CAN transceiver 120, which is adapted to communicate, via a connector 128, on the CAN bus 66.

The control processor 108 is coupled to an optional human/machine interface (HMI) driver 118, which may communicate via the connector 128 to the HMI bus 68. The HMI bus 68 may include any form of communication media and communication format, including, but not limited to, a fiber optic media with an Ethernet format, and a wire media with a two state format.

The PTFE circuit board 150 includes a radar transmitter 152, which is coupled to the DSP 104 through a serial port interface (SPI) 147 and a bus 144, and a transmit antenna 154, which is coupled to the radar transmitter 152.

The LTCC circuit board 156 includes a receiver 158, which is coupled to the DSP 104 through the SPI 147 and a bus 146, and a receive antenna 160, which is coupled to the radar receiver 158. The radar transmitter 152 and the radar receiver 158 may receive the regulated voltages from the voltage regulator 134. The receiver 158 also provides RF signals to the transmitter 152 through a bus 162.

In operation, the DSP 104 initiates one or more chirp control signals (also referred to as ramp signals) by providing a command signal to an event generator 190. In response to the command signal from the DSP, the event generator 190 generates the chirp control signals. Thus, the event generator removes the chirp control signal processing function from the DSP 104. In the embodiment of FIG. 3, the chirp generator is located in the receiver 158. In other embodiments, however, the event generator 190 can be located in other portions of the radar system 14' (FIG. 3).

It should be understood that by removing the control signal waveform responsibility from the DSP 104 and providing an event generator circuit which is separate from the DSP, the event generator can provide more comprehensive chirp control signals. This is because the DSP must serve multiple and differing types of requests while the event generator serves only to generate control signals related to generation of the chirp control signals. The required accuracy of the timing signals generated by the event generator also precludes it from being a direct responsibility of the DSP 104. Also, the DSP 104 is now freed from this time consuming activity, so it can now perform additional critical tasks in parallel.

Each ramp signal has a start voltage and an end voltage. The ramp signal is coupled to a signal source. In response to the ramp signals, the signal source generates RF signals having waveform and frequency characteristics controlled by the ramp signal. The transmitter feeds the RF signals to the transmit antenna 154 which emits (or radiates) the RF signals as RF chirp radar signals. As used herein, the term "chirp" is used to describe a signal having a characteristic (e.g., frequency) that varies with time during a time window. Typically, each chirp has an associated start and end frequency. A chirp may be a linear chirp, for which the frequency varies in a substantially linear fashion between the start and end frequencies. The chirp may also be a non-linear chirp.

The DSP 104 initiates transmission of ramp signals by the event generator 190 for so-called major cycles. A major cycle is a time period during which signals are received in a designated set of the receive beams 22a-22g. The designated set of receive beams may be all of the receive beams 22a-22g or the designated set of receive beams may be only some of the receive beams 22a-22g. A major cycle is comprised of one or more so-called minor cycles. A minor cycle is a period of time during which signals are received in a subset of the designated set of receive beams The DSP 104 will cause the event generator to execute a pre-programmed set of actions, which will cause the VCO to be modulated accordingly, for each minor cycle in turn.

As mentioned above and as will be described herein further below, the DSP 104 initiates each major cycle and each minor cycle by sending a command to the event generator 190 (FIG. 4) which in turn executes controls signals in each minor cycle including the transmission of the ramp control signals (or more simply "ramp signals") in each minor cycle.

The transmit antenna 154 may emit one or a plurality of transmit beams. Regardless of the number of transmit beams, the transmit antenna 154 emits the RF chirp radar signal in a desired geographic area (e.g., over detection zone 24 in FIG. 1).

The receive antenna 160 may be provided having one or a plurality of receive beams. The SOD 14 in FIG. 1, for example, utilizes seven receive beams 22a-22g. Each of the receive beams receives return or echo radar signals, or otherwise generates and/or receives noise signals. Signals received through the receive beams are directed to the radar receiver 158. The radar receiver 158 receives the signals provided thereto from the antenna, down converts the received RF signals to an intermediate frequency (IF) signal, and provides an output signal on signal path 148. In addition to down conversion, the receiver 158 appropriately processes the RF input signals provided thereto from the antenna 160 such that the output signal on signal path 148 can be appropriately received and processed by the DSP 104.

The signal provided to the input of DSP 104 has a frequency content, wherein peaks which occur at different frequencies correspond to detected objects at different ranges. The DSP 104 analyzes the signals provided thereto and identifies objects in the detection zone 24 or 25.

Some objects identified by the DSP 104 may be objects for which an operator of the first vehicle 12 (FIG. 1) has little concern and need not be alerted. For example, an operator of vehicle 12 may not, in some instances, need to be alerted as to the existence of a stationary guardrail along the roadside. Thus, additional criteria may be used to determine when an alert signal should be generated and sent to the operator.

To utilize further criteria, the control processor 108 receives object detections on a bus 106 from the DSP 104. The control processor 108 applies a series of factors and characteristics (i.e., criteria used in addition to that used by DSP 104 to identify an object) to control generation of an alert signal. For example, upon determination by the control processor 108, the alert signal may be generated and sent through a bus 114 to CAN transceiver 120 and communicated on the CAN bus 66, which is indicative not only of an object in the detection zone 24, but also is indicative of an object having predetermined characteristics being in the detection zone. In other embodiments, an alert signal may be communicated by control processor 108 on a bus 122 through the HMI driver 118 to the HMI bus 68.

The fiberglass circuit board 102, the PTFE circuit board 150, and the LTCC circuit board 156 are comprised of materials having known behaviors for signals within particular frequency ranges. It is known, for example, that fiberglass circuit boards have acceptable signal carrying performance at signal frequencies up to a few hundred MHz. LTCC circuit boards and PTFE circuit boards are know to have acceptable signal carrying performance at much higher frequencies. Thus, the lower frequency functions of the SOD system 14 are disposed on the fiberglass circuit board 102, while the functions having frequencies in the radar range of frequencies (e.g., 2 GHz) are disposed on the LTCC and on the PTFE circuit boards 150, 156, respectively.

Figure 4:
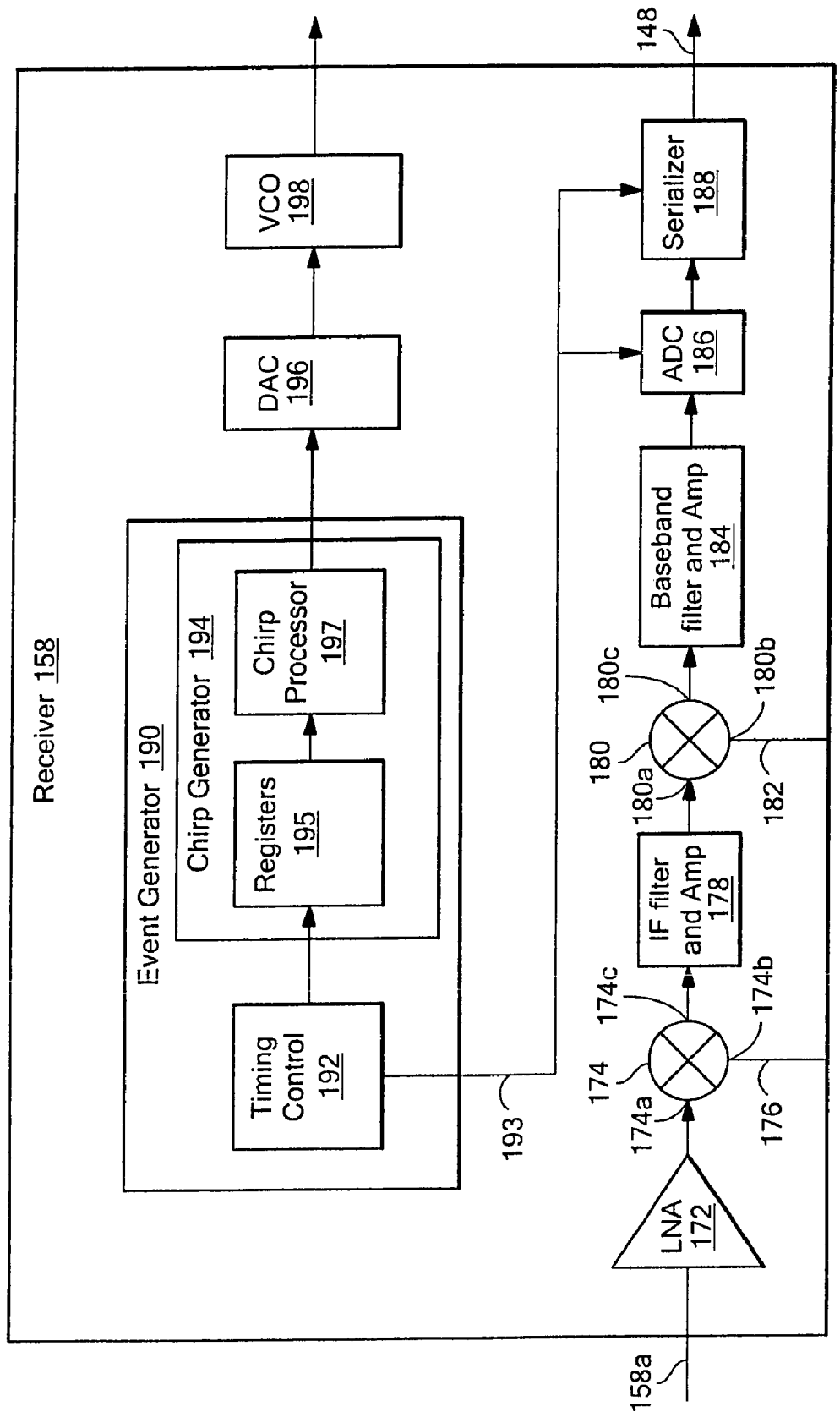
FIG. 4 is a block diagram of a receiver.

Referring to FIG. 4, the receiver 158 includes an RF low-noise amplifier (LNA) 172, a frequency down converter circuit (or mixer) 174, an intermediate frequency (IF) filter and amplifier circuit 178, a mixer 180, a baseband filter and amplifier circuit 184, an analog-to-digital converter (ADC) 186 and a serializer 188. An RF signal received through antenna 160 (FIG. 3) is provided to receiver input 158a and subsequently to an input of the RF LNA 172. The RF LNA 172 provides an amplified version of the signal fed thereto to a first input port 174a of a mixer 174. An RF signal fed along signal path 176 to a second port 174b of the mixer 174 serves as a first local oscillator (LO) signal. Illustrative frequencies for the RF signals from the amplifier 172 and the first LO signal are on the order of 24 GHz and 17 GHz respectively. Mixer 174 receives the RF and the first LO signals provided thereto and provides a down-converted or intermediate frequency (IF) signal at a third port 174c thereof.

The down-converted signal is fed from the third port 174c of the mixer 174 to an IF filter and amplifier circuit 178. The IF filter and amplifier circuit 178 provides a suitably filtered and amplified version of the down-converted signal fed thereto to a first input port 180a of a second mixer 180. An RF signal is fed along a signal path 182 to a second port 180b of the mixer 180 and serves as a second LO signal. Illustrative frequencies for the RF signals from the filter and amplifier circuit 178 and the LO signal are on the order of 6 GHz. Although the exemplary receiver 158 is shown as a direct conversion, dual heterodyne receiver, other receiver topologies may also be used in the SOD system 14. Mixer 180 receives the RF and LO signals provided thereto and provides a second down converted or IF signal at a third port 180c thereof to an input port of a baseband filter and amplifier circuit 184. The baseband filter and amplifier circuit 184 provides a suitably filtered and amplified signal to an input of an analog-to-digital converter (ADC) 186.

The ADC 186 receives the analog signal fed thereto from filter and amplifier circuit 184 and converts the analog signal into digital signal samples which are serialized by a serializer 188 for further processing. In particular, the digital signal samples coupled from the serializer 188 to a DSP (e.g., DSP 104 in FIG. 3) which processes the signals fed thereto to determine the content of the return signal within various frequency ranges.

The event generator 190 includes a timing and control circuit 192 and a chirp generator 194. In general, the event generator 190 operates as a state machine by receiving input values (which are loaded into registers 195, for example) and in response to the input values, providing output values. Event generator 190 controls VCO 198 by sending control signals from the chirp processor through the DAC 196 to the VCO 198. It should be understood that in the embodiment of FIG. 4, since the signal source which generates RF signals to be eventually transmitted via an RF transmit path of the radar is a VCO, then the control signals provided by the event generator to the VCO are provided as voltage control signals with the VCO responsive to the signal level (e.g., voltage level) of the voltage control signal. If the signal source were responsive to other types of signals or other types of signal characteristics (e.g., current signals rather than voltage signals or pulse repetition frequencies rather than signal level), then event generator 190 would provide a suitable control signal. In some embodiments, the VCO 198 may be of a type described, for example, in U.S. Pat. No. 6,577,269, issued Jun. 10, 2003, which is incorporated herein by reference in its entirety.

The event generator also controls processing of digital samples from the serializer 188 by sending a control signal from the timing control circuit 192 to the ADC 186 and the serializer 188. As indicated above, the digital processor 104 initiates processing of a major cycle while the event generator 190 controls the minor cycles which allows DSP 104 to perform other functions such as detection processing.

The chirp generator 194 includes registers 195 and a chirp processor 197. The registers 195 receive slope information which compensate for any non-linearity in the chirp waveform generated by the VCO 198. For example, the registers 195 may include a certain number of registers with a number of registers corresponding to a number of segments of a ramp signal. As will be described further herein, other ones of the registers 195 may hold values for controlling other parameters for forming chirp waveforms. For example, the parameters may include time delays between chirp waveforms, a start voltage for each chirp waveform, a number of chirp waveforms for each minor cycle and a type of chirp waveforms. The register 195 may also be configured so that a register corresponds to a parameter. For example, one of the registers 195 can receive a single value which controls the number of chirp waveforms used in a minor cycle and a different one of the registers can receive a single value which controls the type of chirp waveform in each chirp period. Alternatively, the registers 195 may be configured so that a single value (parameter) loaded into the register 195 defines multiple parameters (e.g. a single value defines both the number of chirp waveforms and the type of chirp waveforms in a minor cycle or multiple minor cycles).

It should thus be appreciated that there is a correspondence between the number of registers 195 designated as slope registers and the number of segments in the ramp signal. The particular number of registers designated as slope registers to use in any particular application is based upon a variety of factors including but not limited to the expected nonlinearity in the slope of the ramp signal. The total linear accuracy of the ramp waveform is affected by the total number of segments the Event Generator can control. Each individual linear segment is fit into a non-linear curve. The larger the number of segments, the more accurate the final result will be.

Figure 5:
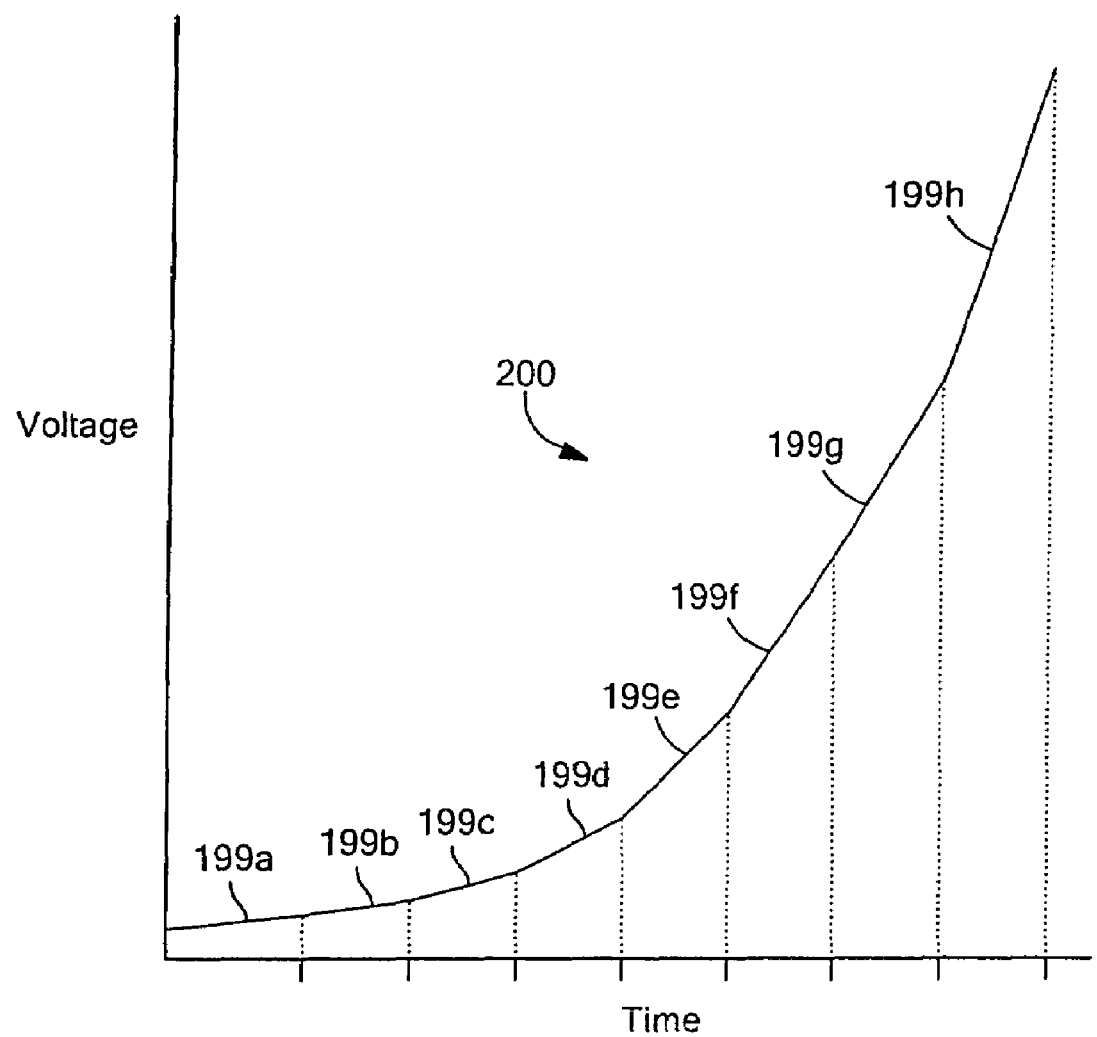
FIG. 5 is a graph of a ramp signal.

As shown in FIG. 5, for example, a ramp signal 200 having eight segments (i.e., a segment 199a, a segment 199b, a segment 199c, a segment 199d, a segment 199e, and a segment 199f, a segment 199g and a segment 199h) is shown. Thus, in this case, registers 195 can include eight registers designated as slope registers (i.e., one slope register for each segment).

The DSP 104 computes a slope value for each of the segments 199a-99h and stores the slope value in a corresponding one of the registers 195 designated as slope registers. Thus, each of the registers designated as slope registers has stored therein a value corresponding to a slope of a different one of the eight ramp signal segments 199a-199h. In one embodiment, each of the segments 199a-199h lasts for an equal period of time. In other embodiments, some or all the segments may be different lengths of time.

The slope value for each segment may be determined using a variety of different techniques. In one technique, for example, SOD 14 utilizes a calibration signal. The calibration may be performed as part of an additional minor cycle. The SOD transmits the calibration signal (where the calibration signal is simply a signal have known characteristics) and receives the corresponding echo signal. The DSP 104 processes the calibration echo signal to determine compensation value which can be used to adjust for the VCO non-linearity. The slopes of each of the segments 199 of the compensation signal are stored in the registers 195.

In one embodiment, the chirp processor 197 may include an adder mechanism that adds a slope value to the previous sum from one of the registers 195. The adder is used to generate the ramp waveform over time. The VCO is connected to a Digital to Analog Converter 196 which is used to modulate the VCO output as directed by the event generator. To generate the ramp waveform, the start value register is first loaded into one of the adder's operand registers. Then, the start value is added to the first slope register value to create the next step on the ramp waveform. The adder continues to increase the value to the D/A converter for up-chirps (or decrease the value on down chirps) on each subsequent add, until the first segment is complete. This process is then repeated for the other seven segments.

Figure 6:
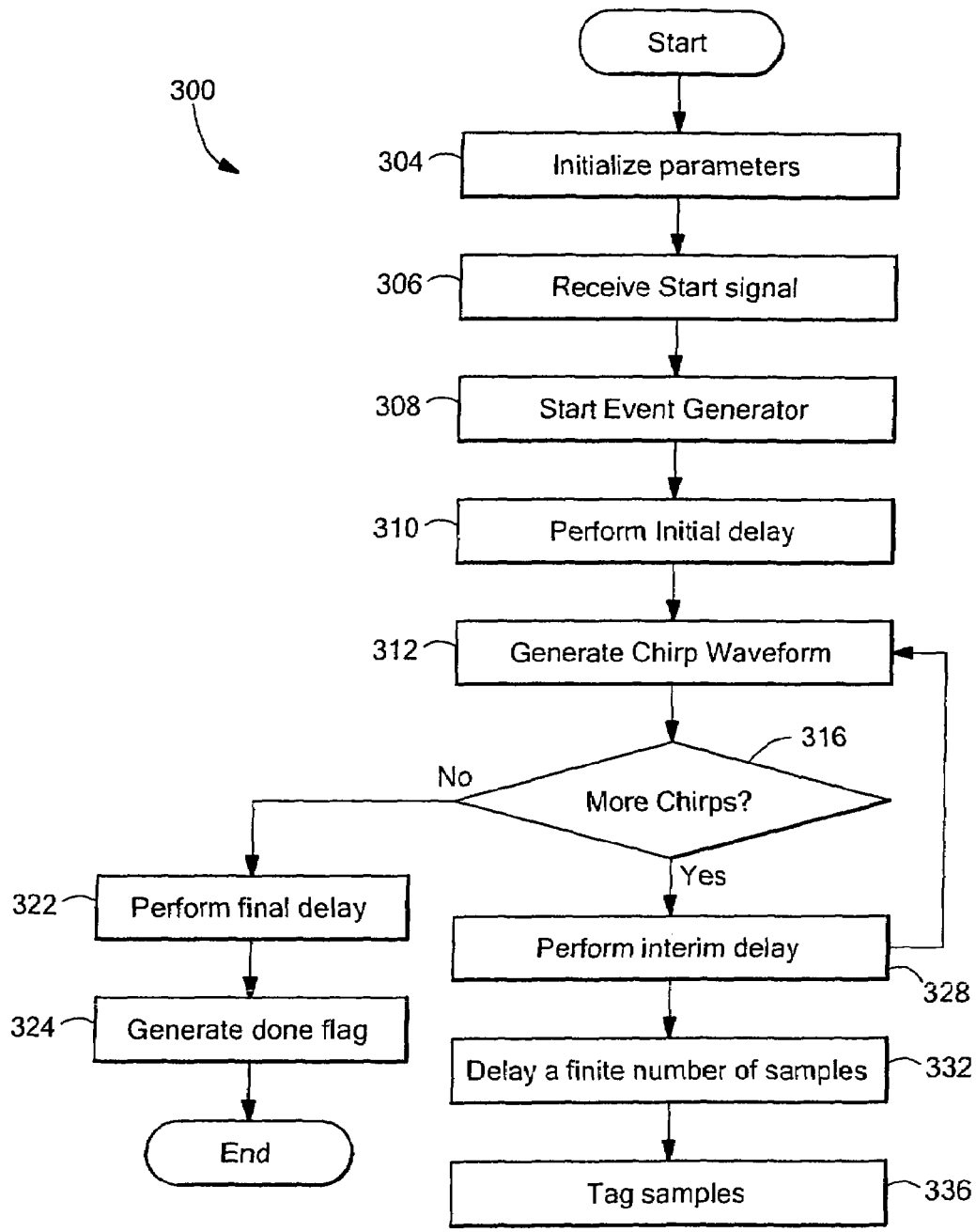
FIG. 6 is a flowchart of an exemplary process for generating event signals.

FIG. 6 is a flow diagram showing an exemplary process 300 for controlling a signal source (e.g., the VCO 198 in FIG. 4) and synchronizing digital samples from an ADC (e.g., the ADC 186 in FIG. 4) during a minor cycle. The processing may be performed by a processing apparatus which may, for example, be provided as part of a SOD system such as that described above in conjunction with FIGS. 1-3.

The rectangular elements (e.g., block 304 in FIG. 6) in the flow diagram are herein denoted "processing blocks" and represent steps or instructions or groups of instructions. Some of the processing blocks can represent an empirical procedure or a database while others can represent computer software instructions or groups of instructions. The diamond shaped elements in the flow diagram (e.g., block 316 in FIG. 6) are herein denoted "decision blocks" and represent steps or instructions or groups of instructions which affect the processing of the processing blocks. It should be noted that some of the steps described in the flow diagram may be implemented via computer software while others may be implemented in a different manner (e.g., using an empirical procedure or via hardware).

Alternatively, some of the processing and decision blocks can represent steps or processes performed by functionally equivalent circuits such as a digital signal processor circuit or an application specific integrated circuit (ASIC). The flow diagrams do not depict the syntax of any particular programming language. Rather, the flow diagrams illustrates the functional information one of ordinary skill in the art requires to perform the steps or to fabricate circuits or to generate computer software to perform the processing required of the particular apparatus. It should be noted that where computer software can be used, many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Turning now to FIG. 6, the exemplary process for controlling a signal source (e.g., the VCO 198 in FIG. 4) and synchronizing digital samples (e.g., digital sample from the ADC 186 in FIG. 4) during a minor cycle begins by initializing parameters as shown in processing block 304.

Figure 8:
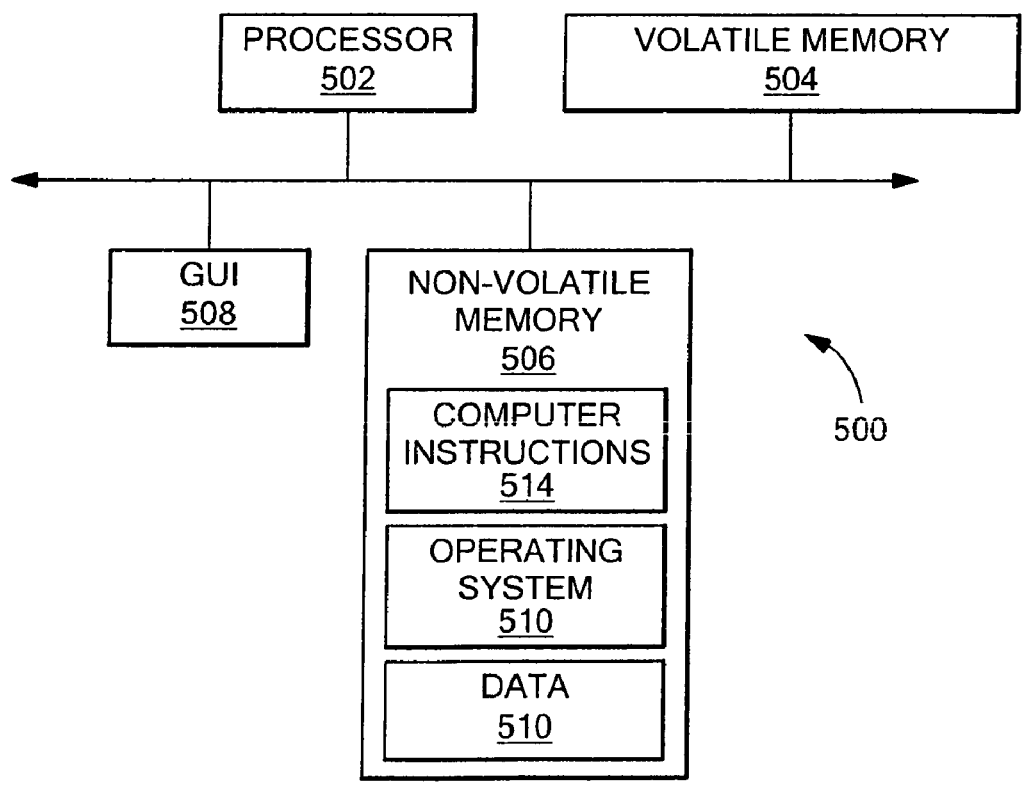
FIG. 8 is a block diagram of a computer system on which the process of FIG. 6 may be implemented.

During an initialization process for the exemplary system shown in FIG. 4, for example, DSP 104 loads slope values into the registers 195, one slope value for each register designated as a slope register. DSP 104 may also load other parameters/values into registers 195. These parameters include the types of chirp waveforms to be used, delays before, after and between the chirp waveforms, the number of chirp waveforms to be used in a minor cycle, and the start voltage of each chirp waveform. A user may designate each of the parameters, for example, using a computer (FIG. 8).

After initialization, process 300 receives a start signal as shown in processing block 306 and the event generator operation begins as shown in processing block 308. In the embodiment of FIG. 4, for example, DSP 104 sends a command signal to the event generator 104 to commence event signal generation.

As shown in processing block 310, an initial delay is performed. In some embodiments, an initial delay is needed to allow the RF signal chain to settle, as sometimes a noise anomaly is introduced upon changing settings of the radar. It is important that the delay is adjustable to compensate for different applications or implementations. The initial delay may be set to zero if no anomaly is introduced.

Figure 7:
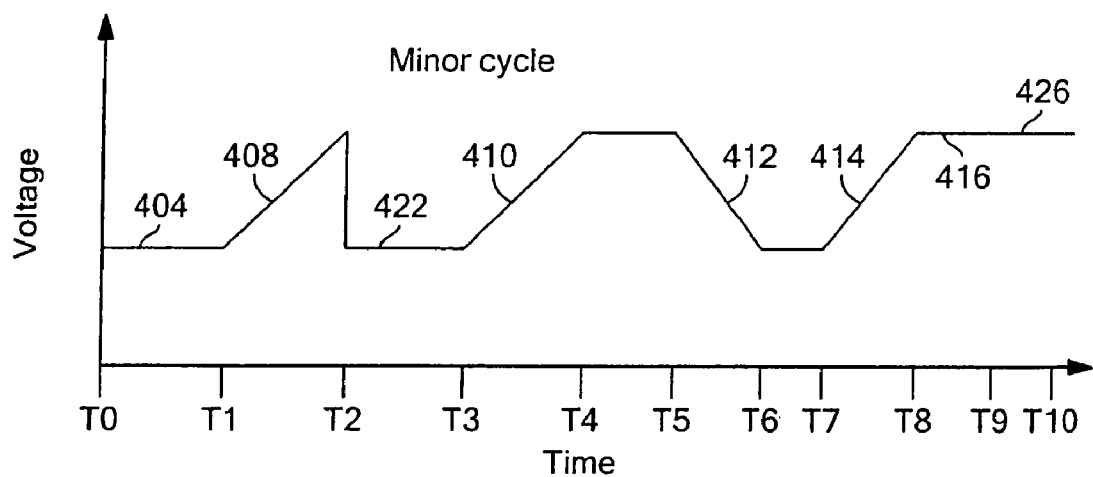
FIG. 7 is a graph of chirp waveforms over a minor cycle.

Referring briefly to FIG. 7, an exemplary waveform for a minor cycle includes an initial delay 404 which occurs between time T0 and time T1. It should be appreciated that delay 404 occurs before any chirp waveforms are generated (i.e., before any chirp periods commence).

Referring again to FIG. 6, after the initial delay a chirp waveform control signal is generated as shown in processing block 312. The chirp waveform control signal may be an up-ramp control signal which generates a so-called "up-chirp" RF waveform, or a down-ramp control signal which generates a so-called "down-chirp" RF waveform, a continuous wave (CW) control signal which generates a CW RF mode waveform. The generation of each chirp waveform is designated by the parameters stored in registers 195. For example, having the slope of the chirp waveforms, the start voltage of the chirp waveforms and the time delays before and after the chirp waveform allows a user to generate the waveforms in FIG. 7. As used herein, a chirp period is the time period in which a chirp waveform is modulated excluding the delays. As will be shown below, FIG. 7 includes five chirp periods over a minor cycle (between times T0 and T10). It should be understood that any other type of chirp waveform control signal suitable to generate an RF waveform shape for use in a particular application can also be used. It should also be understood that the chirp control signal waveform may also be provided from any combination of two or more of the above up-ramp, down-ramp or CW mode control signal waveforms.

Referring briefly again to FIG. 7, a first up-ramp (or up-chirp) control signal waveform 408 is shown between times T1 and T2 (a first chirp period), a second up-chirp waveform 410 is shown between times T3 and T4 (a second chirp period) and a third up-chirp waveform 414 is shown between times T7 and T8 (a fourth chirp period). The "up-chirp" waveform starts at a low voltage and forms a linear ramp to a higher voltage. It should be appreciated that although the up-chirp control signals 408, 410 are shown as linear up-chirps in FIG. 7, those of ordinary skill in the art will appreciate that they need not be linear and that non-linear shapes may also be used.

The chirp control signal waveform may also be provided as a down-ramp (or a "down-chirp") waveform such as "down-chirp" waveform 412 which occurs between time T5 and time T6 (a third chirp period). The "down-chirp" waveform starts at a high voltage and ends at a lower voltage. It should be appreciated that although the down-chirp control signal 412 is shown as a linear down-chirp in FIG. 7 (i.e., a linear ramp between the high and low voltages), those of ordinary skill in the art will appreciate that they need not be linear and that non-linear shapes may also be used.

The chirp waveform may further be a "continuous wave (CW) mode" control signal waveform such as a "CW mode" waveform 416 which occurs between time T8 and time T9 (a fifth chirp period). The CW mode chirp control signal is a fixed voltage which results in an RF signal having a fixed frequency (i.e., a CW RF signal).

Referring again to FIG. 6, once a chirp waveform control signal is generated and provided to the controllable signal source, process 300 continues by determining if additional chirps are needed as shown in decision block 316. If no additional chirp waveforms are needed (i.e., no remaining chirp periods), then processing continues to processing block 322 in which a final delay is performed and then a so-called "done" flag is set to indicate that no additional chirp control signal waveforms are needed as shown in processing block 324.

Referring again to FIG. 7, a final delay 426 occurs after time T9 and after the CW mode chirp waveform 416. In some embodiments, a delay is required to allow the RF signal chain to settle, as the final retrace of the ramp waveform can cause a noise anomaly. For example, event generator 190 (FIG. 4) sends a completion signal to the DSP 104 (FIG. 4) indicating that the minor cycle is complete.

Referring again to FIG. 6, if in decision block 316, a decision is made that additional chirp waveforms are needed (i.e., there are remaining chirp periods), then process 300 performs an interim delay as shown in processing block 328 and then processing proceeds to processing blocks 332 and 336 in which a predetermined number of samples are delayed and then tagged.

In the exemplary control signal waveform of FIG. 7, for example, an interim delay 422 occurs between time T2 and time T3 after the up-chirp waveform 408. Process 300 generates another chirp waveform (312).

Also, with reference to the exemplary embodiment of FIG. 4, when the ADC 186 is first started the initial output from the ADC may not contain useful samples. Thus, event generator 190 waits until a predetermined number of samples are processed by the ADC 186. Choosing the number of samples is dependent on choosing range accuracy versus overall time of the major cycle. A larger number of samples provides better range accuracy but takes more time. A smaller number of samples takes time (and therefore allows more major cycles per second) but gives less range accuracy. In addition, the event generator 190 synchronizes processing (performed by the DSP 104) of the digital samples received from the serializer 188 with the timing of the ramp signals utilized in the minor cycles. The samples are then transmitted to the DSP.

In the embodiment of FIG. 4, for example, each digital sample includes three parts. A first part includes clock data, a second part includes receive data and the third part includes a frame synchronization indicator or "flag." The timing and control circuit 192 tags the samples by sending a command along a bus 193 to the serializer 188 to change, for example, the frame synchronization flag from one value to another value (e.g., from a logical "0" value to a logical "1" value) thereby alerting the DSP 104 that the digital samples received from the serializer 188 and having a "1" flag are to be processed.

It will be appreciated by those skilled in the art that controlling the VCO 198 using process 300 may be modified so that a single parameter may be received from the register 195 which designates the number of chirp waveforms and the type of chirp waveforms in a minor cycle or multiple minor cycles. Furthermore, a single parameter may designate a number of chirp waveforms, the type of chirp waveform along with a start time and end time of the chirp periods.

FIG. 8 shows a computer or other processor 500 adapted to provide signals for controlling a signal source (e.g., VCO 198 in FIG. 4) and synchronizing digital samples from an ADC (e.g., ADC 186 in FIG. 4) during a minor cycle using a process which may be the same as or similar to the process 300 described above in conjunction with FIG. 6.

Computer 500 includes a processor 502, a volatile memory 504, a non-volatile memory 506 (e.g., Flash Memory) and a graphical user interface (GUI) 508. Non-volatile memory 506 stores operating system 510 and data 512 including event signal parameters such as time delays within a minor cycle (e.g., the initial delay, the interim delay(s) and the final delay), the start voltage of each chirp waveform, the slope of each chirp waveform, the number of chirp waveforms and a single parameter which designates the number of chirp waveforms and the type of chirp waveforms in a minor cycle or multiple minor cycles. Non-volatile memory 506 also stores computer instructions 514, which are executed by processor 502 out of the volatile memory 504 to perform process 300. The GUI 508 may be used by a user to configure (1) the time delays between chirp waveforms (2), the start voltage of each chirp waveform, (3) the slope of each chirp waveform, (4) the number of chirps stored in the data 512, (5) a parameter that determines the type of chirp waveforms and the number of chirp waveforms in a minor cycle or multiple minor cycles and (6) a parameter that designates a type of chirp waveform and a chirp period. Additional parameters that can be controlled by the user include gain settings for the various amplifier stages, Filter shaping, channel selection, and calibration points.

It should be appreciated that process 300 is not limited to use with the hardware and software of FIG. 8; it may find applicability in any computing or processing environment and with any type of machine that is capable of running a computer program. Process 300 may be implemented in hardware, software, or a combination of the two. Process 300 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 300 and to generate output information.

The system may be implemented, at least in part, via a computer program product (i.e., a computer program tangibly embodied in an information carrier (e.g., in a machine-readable storage device or in a propagated signal, for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 300. Process 300 may also be implemented as a machine-readable storage medium, configured with a computer program, where upon execution, instructions in the computer program cause the computer to operate in accordance with process 300.

The processes described herein are not limited to the specific embodiments described herein. For example, the processes are not limited to the specific processing order of FIG. 5. Rather, any of the blocks of FIG. 5 may be re-ordered, repeated, combined or removed, performed in parallel or in series, as necessary, to achieve the results set forth above.

While two SOD systems 14, 15 are shown in FIGS. 1 and 2, the system 50 may include any number of SOD systems, including a single SOD system. While the alert displays 82, 86 are shown to be associated with side-view mirrors, the alert displays may be provided in a variety of ways. For example, in other embodiments, the alert displays may be associated with a rear view mirror (not shown). In other embodiments, the alert displays are audible alert displays.

While the CAN bus 66 is shown and described, it will be appreciated that the SOD systems 14, 15 may couple through any of a variety of other busses within the vehicle 12, including, but not limited to, an Ethernet bus, local interconnect network (LIN) bus, and a custom bus.

The system described herein is not limited to use with the hardware and software described above. The system may be implemented in digital electronic circuitry, or in computer hardware, firmware, software, or in combinations thereof.

While three circuit boards 102, 150, 156 are described herein, the SOD system 14 may be provided on more than three or fewer than three circuit boards. Also, the three circuit boards 102, 150, 156 may be comprised of other materials than those shown in FIG. 2.

Method steps associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

The system is not limited to the specific examples described herein. For example, while the system described herein is within a vehicle radar system, the system may be used in any vehicle system utilizing radar Elements of different embodiments described herein may be combined to form other embodiments not specifically set forth above. Other embodiments not specifically described herein are also within the scope of the following claims.

What is claimed is:

1. An event generator configured to provide a control signal to a controllable signal source, the event generator comprising:
   registers, with at least a first one of the registers configured to store a value which is equal to the number of waveforms, at least a second one of the registers configured to store a value which defines the type of waveform; and at least a third one of the registers configured to store a value which is equal to a starting value of the waveforms.

2. The event generator of claim 1, further comprising a chirp processor coupled to receive values from the registers and to provide output signals which control the controllable signal source.

3. The event generator of claim 2, further comprising a timing and control circuit coupled to the registers.

4. The event generator of claim 3 wherein the event generator is coupled to a digital-to-analog converter comprising:
   an input port coupled to an output port of the chirp processor; and
   an output port coupled to a control terminal of the controllable signal source.

5. An event generator configured to provide a control signal to a controllable signal source, the event generator comprising:
   registers, with at least a first one of the registers configured to store a value which is equal to the number of waveforms, at least a second one of the registers configured to store a value which defines the type of waveform for each waveform; and at least a third one of the registers configured to store a value which is equal to a duration of the waveforms.

6. The event generator of claim 5, further comprising a chirp processor coupled to receive values from the registers and to provide output signals which control the controllable signal source.

7. The event generator of claim 6, further comprising a timing and control circuit coupled to the registers.

8. The event generator of claim 7 wherein the event generator is coupled to a digital-to-analog converter comprising:

an input port coupled to an output port of the chirp processor; and an output port coupled to a control terminal of the controllable signal source.

9. The event generator of claim 1 wherein the controllable signal source is a voltage-controlled oscillator.

10. The event generator of claim 9 wherein the event generator is disposed in a detection system of a vehicle.

11. The event generator of claim 10 wherein the detection system is a side-object detection system.

12. The event generator of claim 1 wherein the event generator is disposed in a detection system of a vehicle.

13. The event generator of claim 12 wherein the event generator is disposed in a receiver portion of the detection system.

14. The event generator of claim 5 wherein the controllable signal source is a voltage-controlled oscillator.

15. The event generator of claim 14 wherein the event generator is disposed in a detection system of a vehicle.

16. The event generator of claim 15 wherein the detection system is a side-object detection system.

17. The event generator of claim 5 wherein the event generator is disposed in a detection system of a vehicle.

18. The event generator of claim 17 wherein the event generator is disposed in a receiver portion of the detection system.

19. An event generator configured to provide a control signal to a controllable signal source, the event generator comprising:

registers, with at least a first one of the registers configured to store a value which is equal to the number of waveforms, at least a second one of the registers configured to store a value which defines the type of waveform; and at least a third one of the registers configured to store a value which is equal to a starting value of the waveforms;

a chirp processor coupled to receive values from the registers and to provide output signals which control the controllable signal source; and a timing and control circuit coupled to the registers, wherein the registers receive slope information which compensate for non-linearity in a chirp waveform generated by the controllable signal source, wherein the registers comprise a number of registers corresponding to a number of segments of a ramp signal.

20. The event generator of claim 19 wherein the event generator is coupled to a digital-to-analog converter comprising:

an input port coupled to an output port of the chirp processor; and an output port coupled to a control terminal of the controllable signal source.

21. The event generator of claim 19 wherein the event generator is disposed in a detection system of a vehicle and wherein the event generator is disposed in a receiver portion of the detection system.

22. The event generator of claim 19 wherein the controllable signal source is a voltage-controlled oscillator.

23. The event generator of claim 1 wherein the registers are configured to receive slope information which compensates for non-linearity in a chirp waveform generated by the controllable signal source.

24. The event generator of claim 1 wherein the registers comprise a number of registers corresponding to a number of segments of a ramp signal.

25. The event generator of claim 5 wherein the registers are configured to receive slope information which compensates for non-linearity in a chirp waveform generated by the controllable signal source, and wherein the registers comprise a number of registers corresponding to a number of segments of a ramp signal.

* * * * *

UNITED STATES PATENT AND TRADEMARK OFFICE
CERTIFICATE OF CORRECTION

PATENT NO. : 7,345,619 B2  Page 1 of 1
APPLICATION NO. : 11/323960
DATED : March 18, 2008
INVENTOR(S) : Dennis Hunt It is certified that error appears in the above-identified patent and that said Letters Patent is hereby corrected as shown below:

Col. 2, line 21, delete "a-" and replace with -- a --.

Col. 2, line 29, delete "numbers waveforms" and replace with -- numbers of waveforms --.

Col. 4, line 45, delete "bags" and replace with -- bag --.

Col. 4, line 52, delete "vehicle)." and replace with -- vehicle. --.

Col. 6, line 37, delete "controls" and replace with -- control --.

Col. 7, line 25, delete "know" and replace with -- known --.

Col. 7, line 49, delete "mets-data" and replace with -- meta-data --.

Col. 8, line 50, delete "waveforms. The register 195" and replace with -- waveform. The registers 195 --.

Col. 8, line 57, delete "register 195" and replace with -- registers 195 --.

Col. 9, line 8-9, delete ", and a" and replace with -- , a --.

Col. 9, line 14, delete "199a-99h" and replace with -- 199a-199h --.

Col. 9, line 27, delete "have" and replace with -- having --.

Col. 10, line 9, delete "illustrates" and replace with -- illustrate --.

Signed and Sealed this

Eighth Day of July, 2008

JON W. DUDAS
*Director of the United States Patent and Trademark Office*